US008451724B2

(12) United States Patent
Casey et al.

(10) Patent No.: US 8,451,724 B2
(45) Date of Patent: *May 28, 2013

(54) TRANSPARENT NETWORK TRAFFIC INSPECTION

(75) Inventors: Steven M. Casey, Littleton, CO (US); Amie Elcan, Superior, CO (US); John Butala, Shoreview, MN (US); Felipe Castro, Erie, CO (US); Bruce A. Phillips, Erie, CO (US)

(73) Assignee: Qwest Communications International Inc., Denver, CO (US)

(*) Notice: Subject to any disclaimer, the term of this patent is extended or adjusted under 35 U.S.C. 154(b) by 262 days.

This patent is subject to a terminal disclaimer.

(21) Appl. No.: 12/967,829

(22) Filed: Dec. 14, 2010

(65) Prior Publication Data

US 2011/0080843 A1 Apr. 7, 2011

Related U.S. Application Data

(63) Continuation of application No. 12/342,974, filed on Dec. 23, 2008, now Pat. No. 7,916,635.

(51) Int. Cl.
*H04L 12/28* (2006.01)
*H04L 12/56* (2006.01)
*G06F 15/173* (2006.01)

(52) U.S. Cl.
USPC ............ 370/230; 370/235; 370/401; 709/224

(58) Field of Classification Search
USPC .......... 370/229–238.1, 241.1–252, 389–392, 370/395.2, 400–401, 464–477; 709/217–219, 709/223–225, 238–243, 250
See application file for complete search history.

(56) References Cited

U.S. PATENT DOCUMENTS

| 7,420,976 | B2 * | 9/2008 | Lin ............................ 370/395.43 |
| 7,580,996 | B1 | 8/2009 | Allan et al. |
| 7,617,314 | B1 | 11/2009 | Bansod et al. |
| 7,630,986 | B1 | 12/2009 | Herz et al. |
| 7,633,944 | B1 * | 12/2009 | Chang et al. ................... 370/392 |
| 7,849,408 | B1 * | 12/2010 | Messinger et al. ............. 715/736 |
| 7,886,033 | B2 * | 2/2011 | Hopmann et al. ............. 709/223 |
| 7,916,635 | B2 | 3/2011 | Casey et al. |
| 8,103,755 | B2 * | 1/2012 | Malan et al. .................. 709/223 |
| 8,112,511 | B2 * | 2/2012 | Sim et al. ...................... 709/223 |
| 8,281,390 | B1 * | 10/2012 | Shah et al. ...................... 726/21 |
| 2004/0158618 | A1 | 8/2004 | Shaw |
| 2006/0239254 | A1 | 10/2006 | Short et al. |
| 2007/0226775 | A1 | 9/2007 | Andreasen et al. |
| 2009/0296702 | A1 | 12/2009 | Stevens et al. |
| 2010/0091676 | A1 | 4/2010 | Moran et al. |
| 2010/0162359 | A1 | 6/2010 | Casey et al. |

OTHER PUBLICATIONS

U.S. Appl. No. 12/342,974, Notice of Allowance dated Nov. 29, 2010, 8 pages.
U.S. Appl. No. 12/342,974, Office Action dated Aug. 4, 2010, 12 pages.
U.S. Appl. No. 12/342,974, Notice of Publication dated Jun. 24, 2010, 1 page.
U.S. Appl. No. 12/342,789, Notice of Publication dated Jun. 24, 2010, 1 page.
U.S. Appl. No. 12/342,974; Issue Notification dated Mar. 9, 2011; 1 page.
U.S. Appl. No. 12/342,789; Non Final Office Action dated Sep. 15, 2011; 43 pages.

* cited by examiner

*Primary Examiner* — Tri H Phan
(74) *Attorney, Agent, or Firm* — Swanson & Bratschum, L.L.C.

(57) ABSTRACT

Methods and systems are disclosed for providing parties with levels of transparency into filtering functionality of network traffic inspection implementations. Embodiments include receiving a filter change request from a subscriber over a network that defines a modification to a set of filter criteria for filtering network traffic, the filter criteria being stored in association with the subscriber in a filter criteria data store; updating the set of filter criteria in the filter criteria data store as a function of the filter change request; receiving a content dataset relating to the network traffic; identifying the content dataset as being associated with the subscriber; retrieving the set of filter criteria associated with the subscriber from the data store; and filtering the network traffic as a function of the set of filter criteria. Embodiments further provide layers of access for different entities to the filtered traffic.

27 Claims, 6 Drawing Sheets

TRANSPARENT NETWORK TRAFFIC INSPECTION

RELATED APPLICATIONS

This application is related to the following U.S. patent applications, the entire disclosures of which are hereby incorporated by reference: This application is a continuation of U.S. application Ser. No. 12/342,974 filed on Dec. 23, 2008 by Casey, entitled "Transparent Network Traffic Inspection."

Embodiments of the invention are related to telecommunication services, and in particular, to transparent filtering of subscriber network traffic.

BACKGROUND

In a typical network, a network service provider may facilitate the communication of data between multiple parties over the network. For example, email data, multimedia data, video game data, telephonic data, e-commerce data, and any other desired data may be communicated among users of the network. By inspecting the network traffic, much information may be learned about the network, the data traversing the network, and the parties communicating the data. This information may then be used for targeting advertising, enforcing copyrights, detecting viruses, providing tiered network services, etc.

A number of techniques are known for inspecting network traffic. For example, a network service provider may implement a deep-packet inspection ("DPI") appliance in a network router that connects the service provider's local network to multiple customers' access networks via a digital subscriber line access multiplexer ("DSLAM"). The DPI appliance may be configured to inspect the traffic traversing the access networks to look for specific data (e.g., known viruses) or patterns (e.g., web-browsing habits). As it may be impractical (e.g., it may require too many computational and/or storage resources, or it may slow the network traffic to an undesirable level) to fully inspect each of the likely myriad data packets traversing the network, DPI appliances may typically filter network traffic for inspection.

It may be desirable to add functionality to current network traffic inspection implementations to provide subscribers and/or other parties with levels of transparency into the traffic filtering.

BRIEF SUMMARY

Among other things, embodiments of the invention include methods, systems, devices, and software for providing subscribers and/or other parties with levels of transparency into filtering functionality of network traffic inspection implementations.

In one embodiment, a filter is provided for filtering network traffic that is inspected by a DPI appliance as it traverses a subscriber's access network. The filter operates under a set of filter criteria, a portion of which is modifiable by the subscriber. For example, the filter criteria may dictate that the subscriber does not wish to have certain types of information collected by the DPI appliance. The subscriber is provided with a level of transparency into the filter criteria that are used by the DPI appliance, the filter criteria that are modifiable by the subscriber, and what data is being collected as a function of those filter criteria. Other entities (e.g., other subscribers, content providers, advertisers, service providers, etc.) may be authorized with one or more layers of access to the filtered and collected data.

In one set of embodiments, a method is provided for inspecting network traffic traversing a portion of a communication network using a network traffic inspection system having a traffic inspection module. The method includes receiving a filter change request from a subscriber over the communication network, the filter change request defining a modification to a set of filter criteria for filtering network traffic, the set of filter criteria being stored in association with the subscriber in a filter criteria data store; updating the set of filter criteria in the filter criteria data store as a function of the filter change request; receiving a content dataset at the traffic inspection module, the content dataset relating to the network traffic; identifying the content dataset as being associated with the subscriber; retrieving the set of filter criteria associated with the subscriber from the data store; and filtering the network traffic as a function of the set of filter criteria, so that a portion of the network traffic is stored as inspection data in an inspection data store in association with the subscriber and another portion of the network traffic is discarded. In certain embodiments, the method further includes receiving authentication data over the communication network from an inspection data requester; receiving an inspection data request from the inspection data requester for requested inspection data stored in the inspection data store associated with at least one subscriber; determining as a function of the authentication data whether the inspection data requester is authorized to access the requested inspection data; and when the inspection data requester is authorized to access the requested inspection data, providing the inspection data requester with access to the requested inspection data over the communication network.

In another set of embodiments, a system is provided for inspecting network traffic traversing a portion of a communication network. The system includes a filter criteria data store adapted to store sets of filter criteria for filtering network traffic, each set of filter criteria being stored in association with one of multiple subscribing entities; an interface module in operative communication with the filter criteria data store and adapted to: receive a filter change request from a subscriber over the communication network, the filter change request defining a modification to the set of filter criteria associated with the subscriber, the subscriber being one of the multiple entities; and modify the set of filter criteria associated with the subscriber as a function of the filter change request; a data receiver module, adapted to receive network traffic traversing a portion of the communication network; a traffic inspection module, in operative communication with the data receiver module and adapted to receive a content dataset relating to at least a portion of the network traffic and to identify that the content dataset is associated with the subscriber; and a filter module, in operative communication with the traffic inspection module and the filter criteria data store, and adapted to filter at least a portion of the network traffic as a function of the set of filter criteria associated with the subscriber, so that a portion of the network traffic is stored as inspection data in an inspection data store in association with the subscriber and another portion of the network traffic is discarded.

In yet another set of embodiments, a computational system is provided including a computer-readable storage medium having a computer-readable program embodied therein for inspecting network traffic traversing at least a portion of a communication network. The computer-readable program includes instructions in accordance with the following: receiving a filter change request from a subscriber over the communication network, the filter change request defining a modification to a set of filter criteria for filtering network traffic, the set of filter criteria being stored in association with the subscriber in a filter criteria data store; updating the set of filter criteria in the filter criteria data store as a function of the filter change request; receiving a content dataset at the traffic inspection module, the content dataset relating to the network traffic; identifying the content dataset as being associated with the subscriber; retrieving the set of filter criteria associated with the subscriber from the data store; and filtering the network traffic as a function of the set of filter criteria, so that a portion of the network traffic is stored as inspection data in an inspection data store in association with the subscriber and another portion of the network traffic is discarded.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Among other things, embodiments of the invention include methods, systems, devices, and software for providing subscribers and/or other entities with levels of transparency into filtering functionality of network traffic inspection implementations. In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

Various embodiments are described herein with reference to the Internet. However, embodiments of the invention may be implemented in any network. Further, the term "transparent" as used herein (e.g., in the context of embodiments providing transparent filtering) is not intended necessarily to indicate complete transparency. Various embodiments provide various levels of transparency into functionality of filters and other elements of network traffic inspection.

Figure 1:
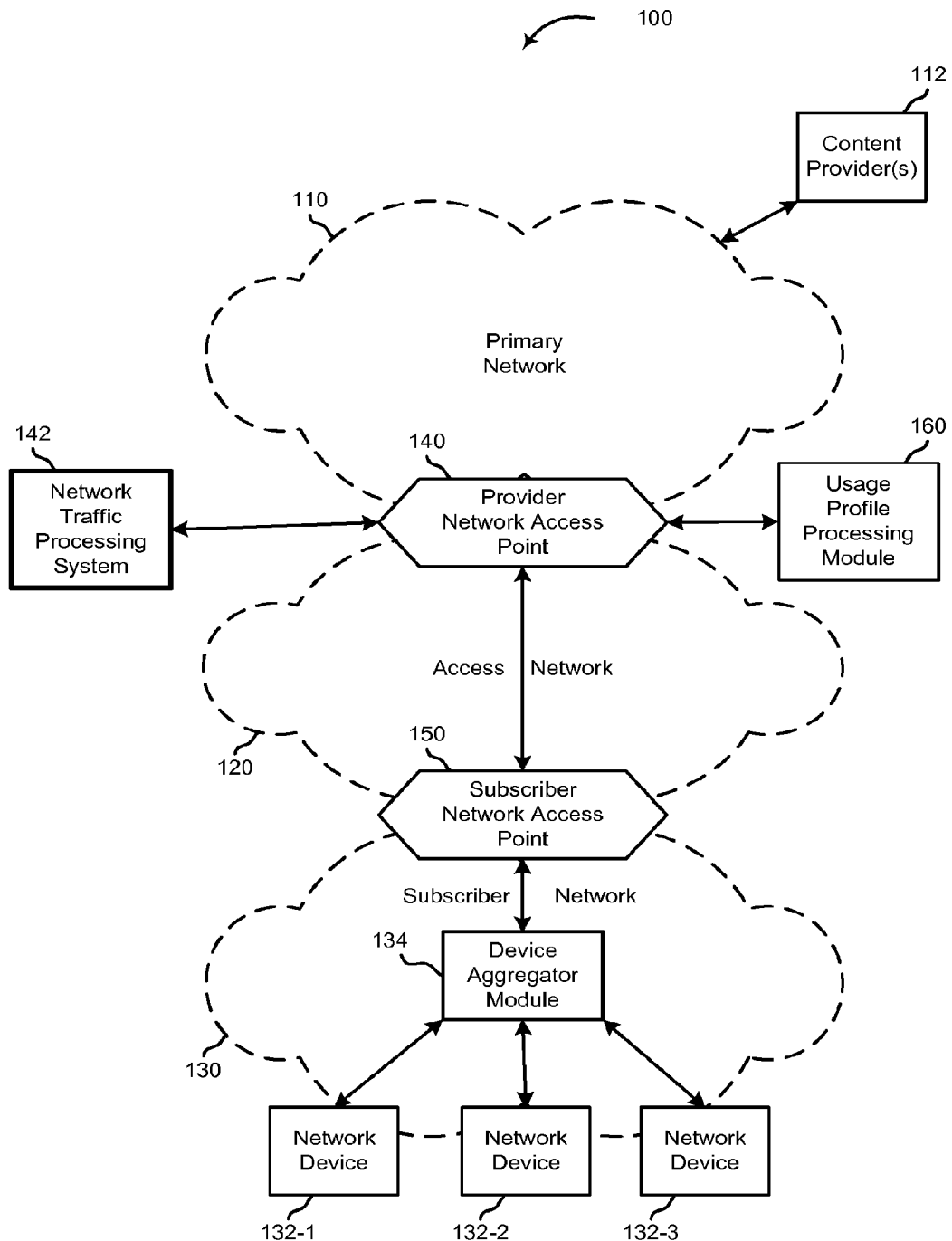
FIG. 1 shows a simplified diagram of an embodiment of a network environment that may be used according to various embodiments of the invention.

Turning first to FIG. 1, a simplified diagram is shown of an embodiment of a network environment that may be used according to various embodiments of the invention. The network environment 100 includes a primary network 110, an access network 120, and a subscriber network 130. These various networks may work together to provide a communicative coupling between content providers 112 and end user network devices 132.

In some embodiments, a customer of network services accesses the network services through one or more end user network devices 132. End user network devices 132 may include, for example, laptop computers, cell phones, personal digital assistants ("PDAs"), webcams, network printers, voice-over-Internet-protocol ("VoIP") terminals, Internet protocol television ("IPTV") terminals, and/or any other type of device or system adapted to communicate data with a network (or more specifically, with the device aggregator module 134 in the subscriber network 130). In certain embodiments, data from the various end user network devices 132 is aggregated by a device aggregator module 134 (e.g., a modem, router, femtocell, etc.). The device aggregator module 134 may include, or be in communication with, a subscriber network access point 150.

In certain embodiments, the end user network devices 132, the device aggregator module 134, and the subscriber network access point 150 may be considered as part of the subscriber network 130 (e.g., the subscriber's home network). The subscriber network 130 (e.g., data from the end user network devices 132 aggregated by the device aggregator module 134) may be communicatively coupled, through the subscriber network access point 150, with its respective access network 120. The access network 120 may, in turn, communicatively couple the subscriber network access point 150 with a provider network access point 140, thereby providing the subscriber network 130 with access to the primary network 110.

In some embodiments, the content providers 112 (e.g., application providers, network service providers, network end users, etc.) are in communication with the primary network 110. For example, the content providers 112 may communicate data with the primary network 110 over a network topology similar to the one used by the end user network devices 132 (e.g., including a content provider access network). It will be appreciated that many types of network topologies are possible, and that many parties (e.g., customer, content providers, service providers, etc.) may share or require network elements. For example, many customers may communicate with many content providers over the primary network 110 via a number of dedicated and/or shared access networks 130.

Embodiments of the network environment 100 are adapted to provide various types of functionality using various types of network elements. For example, network elements may include various types of data processing (e.g., generation, storage, aggregation, etc.) modules and systems. These modules and systems may communicate with or be part of the network environment 100 in various ways and may be controlled by one or more of various parties. In the embodiment shown, the network environment 100 includes a network traffic processing system 142 and a usage profile processing module 160.

In some embodiments, the network traffic processing system 142 is adapted to processes (e.g., inspect, filter, aggregate, store, etc.) network traffic at the data packet level. It will be appreciated that types of data packet inspection are known in the art. One type of data packet inspection is called Deep Packet Inspection ("DPI"), or "Complete Packet Inspection." A DPI appliance may filter and inspect the header and/or payload portions of data packets as they cross an inspection point in a network. Another type of packet inspection may include so-called "shallow packet inspection," sometimes referred to simply as "packet inspection," which may check only header portions of data packets. Embodiments of the invention may use any type of network traffic inspection, and reference to specific types of network traffic inspection should not be construed as limiting the scope of the invention.

In certain embodiments, the network traffic processing system 142 is in communication with the provider network access point 140 at the provider end of the customer's access network 120. Because network traffic destined for the customer's subscriber network access point 150 passes through the provider network access point 140, the network traffic processing system 142 may use this location as an inspection point for examining customer-bound data packets. As data packets pass the inspection point, some or all of the packets may be examined for certain types of information (e.g., or stored or buffered for further processing). For example, the network traffic processing system 142 may inspect the network traffic for certain patterns (e.g., bandwidth usage, web browsing habits, etc.), for certain content (e.g., known virus or worm strings, pattern matching, etc.), etc. The traffic and/or data relating to the traffic may then be stored, further processed (sorted, filtered, mined, etc.), and/or shared with other network elements (e.g., the usage profile processing module 160). Functionality of the network traffic processing system 142 is discussed more fully below.

In some embodiments, the network traffic processing system 142 is adapted to process (e.g., inspect, filter, store, etc.) network traffic associatively with respect to a subscriber, network node, and/or end user network device 132. For example, the network traffic processing system 142 may include various types of network probes, sniffers, inspection appliances, and other devices. In one embodiment, as the data from the various end user network devices 132 is aggregated at the device aggregator module 134, the data may be processed by a device data processing module. In some embodiments, the device data is processed to determine which end user network device 132 is associated with particular traffic (e.g., by data packet, by data set, etc.). In certain embodiments, the device data is further processed to determine (e.g., or at least guess) a device type to associate with each of the set of end user network devices 132. The traffic may then be processed by the network traffic processing system 142 as a function of the associated device or device type determined by the device data processing module.

In some typical networks, like the network environment 100, a "user" (e.g., a subscriber, a network node, etc.) requests access to network services from a network service provider. In some embodiments, the requests are handled by an authentication, authorization, and accounting ("AAA") server. In one embodiment, the AAA server uses the Remote Authentication Dial-In User Service ("RADIUS") standard. Information collected by these and/or other systems may be used to associate a particular "user" with traffic being processed by the network traffic processing system 142. These and/or other systems may also have access to additional "user" information, like a subscriber's account information (e.g., name, address, billing information, etc.), preferences (e.g., what types of content the subscriber prefers, whether the subscriber has subscribed to listserves or multicast streams, whether the subscriber has opted into or out of certain types of data collection or advertising, etc.), etc.

There are many ways for the various network elements to profile "user" information and/or other types of information in the network environment 100. In some embodiments, the profiling functionality is provided partially or completely by the usage profile processing module 160. Embodiments of the usage profile processing module 160 communicate with various types of network elements adapted to profile different types of information. For example, the usage profile processing module 160 may be in communication with a device data processing module (e.g., as described above), a user data processing module, etc. Using information from these and/or other network elements, the usage profile processing module 160 may generate one or more types of network usage profiles. For example, the usage profile processing module 160 may generate devices-by-node profiles, devices-by-customer profiles, traffic-by-device profiles, traffic-by-customer profiles, traffic-by-device-by-customer profiles, etc. Descriptions of network environments and network elements, similar to and in addition to those described herein, can be found in U.S. patent application Ser. No. 12/342,789, filed Dec. 23, 2008, entitled "NETWORK USER USAGE PROFILING," which is hereby incorporated by reference in its entirety for all purposes. Also, some additional types of profiling systems and methods are described in U.S. patent application Ser. No. 12/234,801, filed Sep. 22, 2008, entitled "DYNAMIC MODEM BANDWIDTH CHECKING," which is hereby incorporated by reference in its entirety for all purposes.

Figure 2:
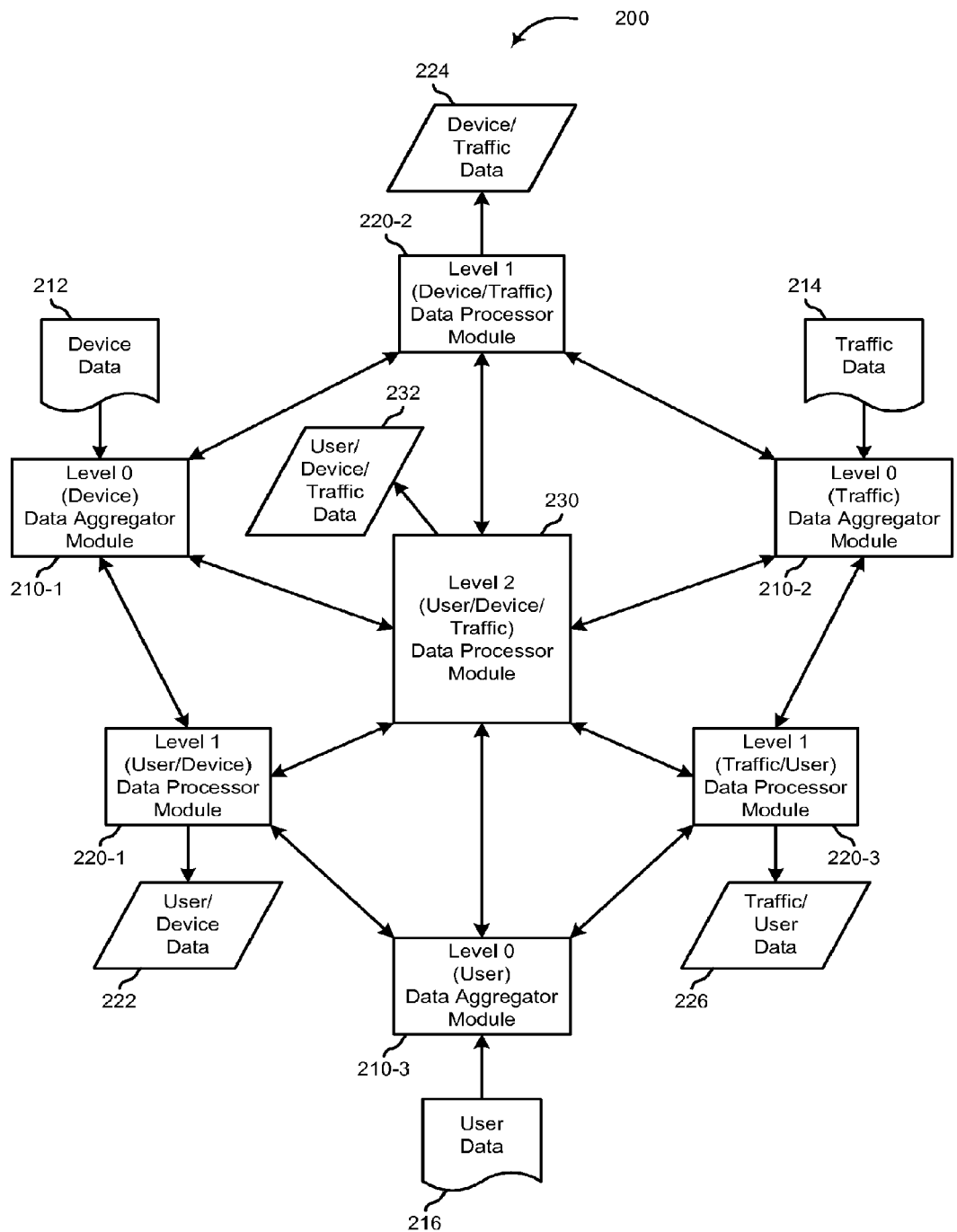
FIG. 2 shows a simplified data flow diagram, illustrating how different data may be used to generate different profiles, according to various embodiments of the invention.

By having access to various types of information from the various modules in the network environment 100, the usage profile module 160 may be able to generate a number of types of profiles, providing a number of different types of information. Some of these types of profiles and data are illustrated by FIG. 2. FIG. 2 shows a simplified data flow diagram, illustrating how different data may be used to generate different profiles, according to various embodiments of the invention.

For the sake of clarity, the various data is shown in the context of a generic network arrangement 200 having various modules that may be considered in tiers or levels. A module that aggregates and/or processes a single category of data may be considered a level-0 module 210, a module that processes data that has been processed by at least one level-0 module may be considered a level-1 module 220, a module that processes data that has been processed by at least one level-1 module may be considered a level-2 module 230, etc.

In some embodiments, a lowest level of data includes device data 212 (e.g., data traceable to a particular end-user network device, etc.), traffic data 214 (e.g., data traversing an access network), and user data 216 (e.g., subscriber information). As discussed above, the device data 212 may be processed by a first level-0 module 210-1, the traffic data 214 may be processed by a second level-0 module 210-2 (e.g., the network traffic processing system 142 in FIG. 1), and the user data 216 may be processed by a third level-0 module 210-3. Each of these level-0 modules 210 may process its respective data in one or more different ways (e.g., including aggregating, filtering, buffering, storing, associating, parsing, etc.). Each of the level-0 modules 210 may be in communication with one or more other level-0 modules 210 to provide level-1 functionality via a level-1 module 220. In some embodiments, the level-1 modules 220 are implemented as part of one or more of the level-0 modules 210. In other embodiments, the level-1 functionality is provided by separate level-1 modules 220 in communication with one or more of the level-0 modules 210.

A first level-1 module 220-1 processes device data 212 and user data 216 to generate user/device data 222. For example, user/device data 222 may include data useful for generating a devices-by-user profile. A second level-1 module 220-2 processes device data 212 and traffic data 214 to generate device/traffic data 224. For example, device/traffic data 224 may include data useful for generating a traffic-by-device profile. A third level-1 module 220-3 processes traffic data 214 and user data 216 to generate traffic/user data 226. For example, traffic/user data 226 may include data useful for generating a traffic-by-user profile. In some embodiments, a level-2 module 230 processes device data 212, traffic data 214, and user data 216 (e.g., or some combination of user/device data 222, device/traffic data 224, and traffic/user data 226) to generate user/device/traffic data 232. For example, user/device/traffic data 232 may include data useful for generating a traffic-by-device-by-user profile and/or another type of network usage profile.

These different types of profiles may be used in many different ways. For example, some or all of the different types of data and/or profiles may be used to provide traffic trending and patterning, network management, device and network security, targeted advertising, targeted service offering, service bundling, etc. The profile data may also be stored and/or further processed to provide these and additional types of information and functionality. It will be appreciated that, in some embodiments, different amounts and levels of data, data profiles, or analysis capabilities may also be licensed or sold (e.g., anonymously) to entities (e.g., advertisers, content providers, etc.) to provide various revenue streams.

In one example, a network service provider, named NSP, may purchase the right to query certain network usage profiles. The NSP may access and query traffic-by-user profiles to determine how many users use voice-over-Internet-protocol ("VoIP") services from competing network service providers. Advertisements may then be targeted to those users. Then, targeted ads may be sent to the users to encourage them to switch over to using NSP's VoIP services. For additional information (e.g., and potentially for additional cost) NSP may be able to retrieve the data in the form of traffic-by-customer profiles (e.g., by further aligning each user in the traffic-by-user profiles with customer information identifying those users).

In another example, NSP may wish to drill down to the device level by querying traffic-by-device-by-user profiles. Using this information, it may be possible to generate a report of the sites and/or services being used by each device for each user (e.g., or subscriber). For example, an entry in the report may indicate a user who watched the movie "Ocean's Thirteen" streamed over the Internet using a NetFlix application on May 8, 2008 at 7:00 pm. Further information may be retrievable in association with this record, like the movie viewing duration, network performance characteristics (e.g., bandwidth, error rate, etc.), whether the viewing matches the user's typical viewing habits, whether it indicates new device or application capability or access, information about the user's preferences, personal or billing information about the user, etc.

One illustrative report is shown as Report 1. Report 1 provides information about a user's network video traffic over the course of some time period. As illustrated, for User "J Smith," the report includes video devices used, sites most frequently visited using the device, peak average bandwidth usage, peak usage times, network errors per video session, etc. This information may indicate that targeting "New Music Videos" ads to the customer on Wednesday nights may be cost-effective for this customer, since the customer appears to have significant activity on iTunes at that time of the week. Alternatively, the report may indicate that display-based ads should not be targeted to all the user's devices, since the user apparently uses a VoIP phone and a webcam, neither of which may have display capability.

| Report 1: Home Profile - User J Smith - Daily Report - Denver, CO May 08, 2008 | | | | |
| --- | --- | --- | --- | --- |
| Video Device | Top Sites | Peak Usage Mbps | Peak Usage Day/Time | Network Errors/ Session |
| PC - Dell | Google, Amazon | 1,000 | Monday - 2 pm | 100 |
| VoIP Phone | Qwest VoIP | 200 | Sat - 7 pm | 500 |
| iPod - iTunes | Apple.com | 2,000 | Wed - 8 pm | 200 |
| Linksys WebCam | VideoChat.com | 500 | Tues - 10 am | 50 |
| xBox 360 | msn.live.com | 600 | Sat - 9 pm | 200 |

In yet another example, reports over many users may be generated. For example, on an hourly, daily, weekly, or other basis, reports may be generated to show how many users watched video content on the NSP network in Denver, Colo. The report of video sites over a time period may look like the illustrative report shown in Report 2.

| Report 2: "Qwest Internet Video Usage for Denver, CO from Aug. 1, 2008 to Aug. 8, 2008 | | | | |
| --- | --- | --- | --- | --- |
| Video Site | Movies Viewings | Peak Viewing | Viewing Devices | Network Errors/Movie |
| NetFlix | 1000 | 7 pm | 1000 PC | 5 |
| Blockbuster | 500 | 8 pm | 500 PC | 3 |
| iTunes | 300 | 6 pm | 200 iPod, 100 PC | 4 |
| Google Video | 100 | 9 pm | 50 PDA, 50 PC | 6 |
| Hulu | 99 | 8 pm | 99 PC | 1 |

Report 2 shows some illustrative data that may be included in a report. Of course, a usage profile may include many additional or different types of information, and records in the report may be associated with that information. As illustrated in Report 1, usage profile data may be used to determine information, including which video sites are being visited by a set of customers, how many movies are viewed at those sites, when peak viewing times occur, what types of devices were used to view the information, average numbers of network errors per movie, etc.

It will be appreciated that many other types of profiles, data, reports, functionality, etc. are possible, according to embodiments of the invention. Further, it will be appreciated that the functionality described with respect to any one module may be provided by, shared with, or divided among other modules. Even further, it will be appreciated that the functionality of the various modules may be implemented in many different ways without departing from the invention.

Notably, large amounts of data may be collected to support various embodiments (e.g., by the network traffic processing system 142 of FIG. 1). As it may be undesirable to collect certain types of information (e.g., a subscriber may wish to prevent certain private information from being collected) or it may be impractical (e.g., it may require too many computational and/or storage resources, or it may slow the network traffic to an undesirable level) to fully inspect each of the likely myriad data packets traversing the network, embodiments of the network traffic processing system 142 filter the network traffic. In some embodiments, functionality is provided to increase transparency into the operation of the filter and the data collected by the network traffic processing system 142.

Figure 3:
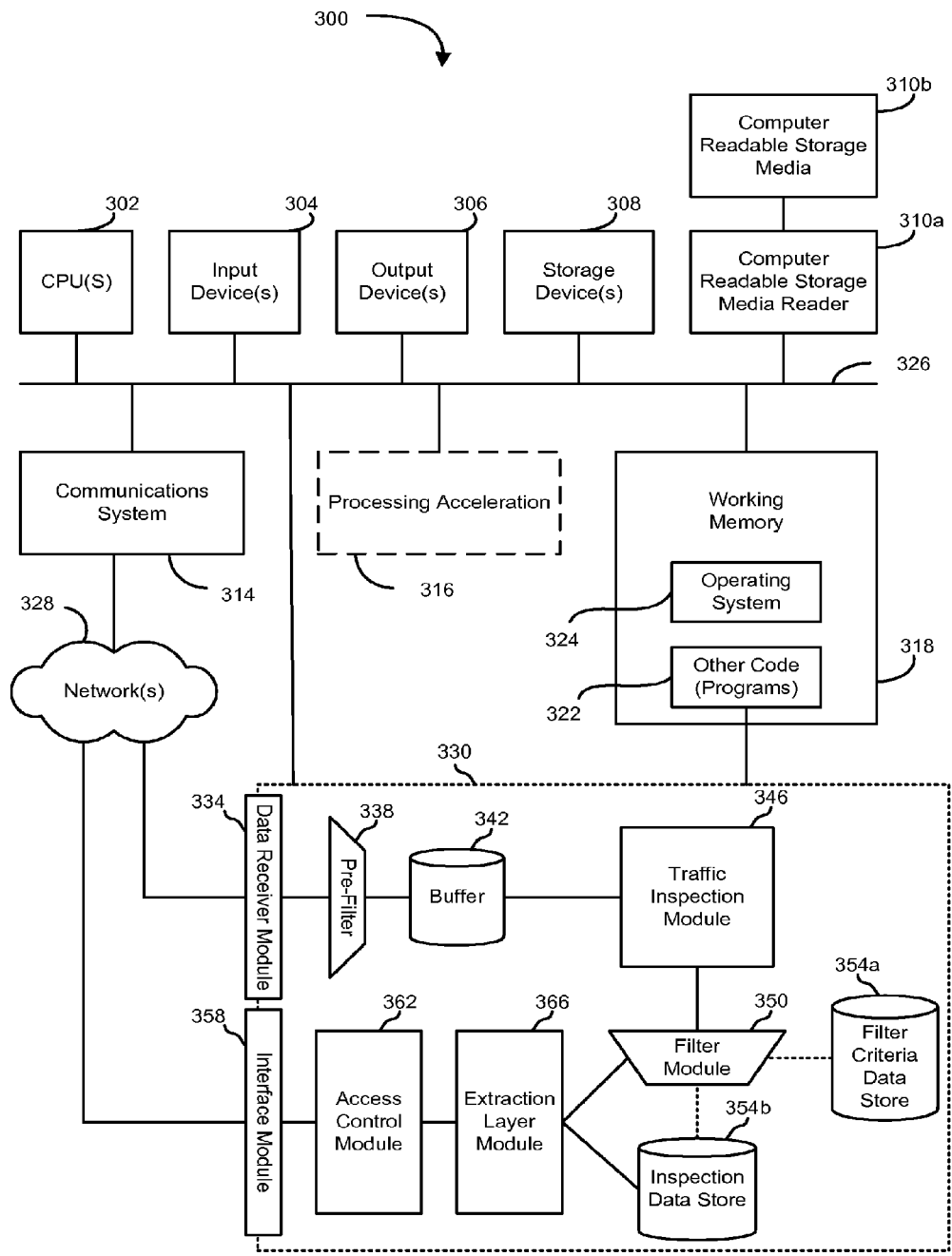
FIG. 3 shows an illustrative computational system for providing some or all of the functionality of a network traffic processing system, according to various embodiments of the invention.

FIG. 3 shows an illustrative computational system for providing some or all of the functionality of a network traffic processing system, according to various embodiments of the invention. The computational system 300 is shown having hardware elements that may be electrically coupled via a bus 326 (or may otherwise be in communication, as appropriate). The hardware elements may include one or more processors 302, including without limitation one or more general-purpose processors and/or one or more special-purpose processors (such as digital signal processing chips, graphics acceleration chips, and/or the like); one or more input devices 304, which can include without limitation a mouse, a keyboard, and/or the like; and one or more output devices 306, which can include without limitation a display device, a printer, and/or the like.

The computational system 300 may further include (and/or be in communication with) one or more storage devices 308, which can comprise, without limitation, local and/or network accessible storage and/or can include, without limitation, a disk drive, a drive array, an optical storage device, a solid-state storage device such as a random access memory ("RAM"), and/or a read-only memory ("ROM"), which can be programmable, flash-updateable, and/or the like. Embodiments of the storage devices 308 may include or provide functionality of a data store.

The computational system 300 might also include a communications subsystem 314, which can include without limitation a modem, a network card (wireless or wired), an infrared communication device, a wireless communication device and/or chipset (such as a Bluetooth device, an 802.11 device, a WiMAX device, cellular communication facilities, etc.), and/or the like. The communications subsystem 314 may permit data to be exchanged with one or more networks 328 (e.g., including the primary network 110, access network 120, or subscriber network 130 of FIG. 1, and/or any other networks or devices described herein). In many embodiments, the computational system 300 will further comprise a working memory 318, which can include a RAM or ROM device, as described above.

The computational system 300 also may include software elements, shown as being currently located within the working memory 318, including an operating system 324 and/or other code, such as one or more application programs 322, which may include computer programs of the invention, and/or may be designed to implement methods of the invention and/or configure systems of the invention, as described herein.

Merely by way of example, functionality of one or more systems, components, or procedures described herein might be implemented as code and/or instructions executable by a computer (and/or a processor within a computer). A set of these instructions and/or code might be stored on a computer readable storage medium 310b. In some embodiments, the computer readable storage medium 310b is the storage device(s) 308 described above. In other embodiments, the computer readable storage medium 310b might be incorporated within the computational system 300.

In still other embodiments, the computer readable storage medium 310b might be separate from the computational system 300 (i.e., a removable medium, such as a compact disc, etc.), and/or provided in an installation package, such that the storage medium can be used to configure a general purpose computer with the instructions/code stored thereon. These instructions might take the form of executable code, which is executable by the computational system 300 and/or might take the form of source and/or installable code, which, upon compilation and/or installation on the computational system 300 (e.g., using any of a variety of generally available compilers, installation programs, compression/decompression utilities, etc.), then takes the form of executable code. In these embodiments, the computer readable storage medium 310b may be read by a computer readable storage media reader 310a.

In one embodiment, the invention employs the computational system 300 to perform functionality of embodiments of the invention. According to a set of embodiments, some or all of the functions are performed by the computational system 300 in response to processor 302 executing one or more sequences of one or more instructions (which might be incorporated into the operating system 324 and/or other code, such as an application program 322) contained in the working memory 318. Such instructions may be read into the working memory 318 from another machine-readable medium, such as one or more of the storage device(s) 308 (or 310). Merely by way of example, execution of the sequences of instructions contained in the working memory 318 might cause the processor(s) 302 to perform one or more procedures of the methods described herein. In this way, the computational system 300 can be "configured to," "adapted to," or "operable to" perform any number of such procedures or methods.

It is worth noting that the terms "machine readable medium" and "computer readable medium," as used herein, refer to any medium that participates in providing data that causes a machine to operate in a specific fashion. In an embodiment implemented using the computational system 300, various machine-readable media might be involved in providing instructions/code to processor(s) 302 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (e.g., 308 or 310). Volatile media includes, without limitation, dynamic memory, such as the working memory 318. Transmission media includes coaxial cables, copper wire, and fiber optics, including the wires that comprise the bus 326, as well as the various components of the communication subsystem 314 (and/or the media by which the communications subsystem 314 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 302 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 300. These signals, which might be in the form of electromagnetic signals, acoustic signals, optical signals, and/or the like, are all examples of carrier waves on which instructions can be encoded, in accordance with various embodiments of the invention.

The communications subsystem 314 (and/or components thereof) generally may receive the signals, and the bus 326 then may carry the signals (and/or the data, instructions, etc. carried by the signals) to the working memory 318, from which the processor(s) 302 may retrieve and execute the instructions. The instructions received by the working memory 318 may optionally be stored on a storage device 308 either before or after execution by the processor(s) 302. Notably, in certain embodiments, the communication subsystem 314, input devices 304, output devices 306, and/or other components of the computational system 300 may be used to communicate with one or more other computational systems 300.

As such, it will be appreciated that all or some of the functions of the systems, devices, and methods described herein may be implemented as software or firmware components, dedicated hardware components, etc. For example, in one embodiment, the working memory 318 includes code 322 for executing functionality of an embodiment of a network traffic processing system 330 (e.g., like the network traffic processing system 142 of the network environment 100 of FIG. 1). In another embodiment, some or all of the functionality of the network traffic processing system 330 may be implemented in dedicated or multi-purpose components that are in communication with the bus 326.

Embodiments of the network traffic processing system 330 may include functionality that may be implemented in software routines, sub-modules, etc. In the embodiment illustrated, one non-limiting arrangement is shown for implementing functionality of the network traffic processing system 330. The arrangement includes functional blocks, some or all of which can be implemented either as code (e.g., as part of or in communication with the code 322 implemented in working memory 318) or as sub-modules in communication with the bus 326.

Embodiments of the network traffic processing system 330 inspect traffic traversing a portion of the network(s) 328 (e.g., by placing a DPI appliance on a subscriber's access network). The inspected traffic is received at a data receiver module 334. The received data may include any traffic traversing the inspected portion of the network(s) 328, like data from content providers destined for subscribers, or data from other data processing modules (e.g., device data, network traffic data, user data, etc.).

In some embodiments, the data receiver module 334 is in communication with one or more pre-processing components, like a pre-filter module 338, a buffer module 342, and/or a traffic inspection module 346. The pre-filter module 338 may pre-filter data (e.g., parse certain data from the flow of network traffic). For example, pre-filtering the data may allow more efficient processing of the network traffic (e.g., by stripping payload information from data packets where only header information is desired). The pre-filtered network traffic may be buffered in the buffer module 342 to await further processing by the traffic inspection module 346.

Embodiments of the traffic inspection module 346 receive the pre-filtered data for further pre-processing. For example, the traffic inspection module 346 may provide many different types of data pre-processing functions, including aggregating data (e.g., collecting data from various access networks or network devices), translating data (e.g., decoding data), analyzing data (e.g., logging data over time, finding trends and patterns, interpolating or extrapolating data, making probabilistic determinations, etc.), interpreting content (e.g., matching and/or adapting content to network usage or other profile data, associating content with particular subscribers or devices, etc.), interpreting traffic to make security determinations, etc. Typically, the pre-processed data may be either streamed to a filter module 350 or buffered (e.g., in the buffer module 342) for use by the filter module 350.

The filter module 350 receives a set of filter criteria from a filter criteria data store 354a. The filter criteria may include any useful type of criteria for filtering the pre-processed network traffic. In some embodiments, the filter criteria data store 354a stores a number of sets of filter criteria, each associated with a particular subscriber. For example, the set of filter criteria may be tailored to specific preferences or network usage characteristics of its associated subscriber. In certain embodiments, a portion of the filter criteria is modifiable by the associated subscriber. For example, some or all of the filter criteria may be preset to certain default values, others may not be modifiable (e.g., hard coded, etc.), still others may be modifiable by a service provider, and yet others may be modifiable by the subscriber.

It will be appreciated that filter criteria may include any useful criteria for filtering the network traffic and may be modified in any useful way. In some embodiments, preset profiles of filter criteria may be applied to the traffic inspection module 346 (e.g., by storing the filter criteria profile in the filter criteria data store 354a). In one embodiment, an Internet service provider ("ISP") establishes a default profile for filtering network traffic. The default profile may include filter criteria that are standardized across the ISP's subscriber base, or tailored to individual subscribers or groups of subscribers. For example, the ISP may filter traffic to facilitate collection of information on web browsing habits (e.g., to use in generating a user usage profile, to determine what types of devices are used by the subscriber, to see what types of content are being accessed by the subscriber, etc.). The default profile may then be modified to some extent by authorized entities.

In other embodiments, an entity (e.g., a subscriber, a content provider, an Internet watchdog group, a regulatory organization, etc.) generates a set of filter criteria. The set of filter criteria is then applied to some or all subscribers' traffic using the filter module 350. The set of filter criteria may include criteria for complying with social, Internet, legal, government, and/or other standards. For example, a content provider may supply a set of filter criteria in support of the privacy policy it has with its content users, or a regulatory authority may supply a set of filter criteria to limit storage of private personal information.

In various embodiments, receiving the set of filter criteria from a filter criteria data store 354a includes generating the retrieved set of filter criteria from multiple stored sets of filter criteria. For example, the filter criteria data store 354a includes filter criteria that apply to the entire subscriber base (e.g., generated and/or controlled by an ISP), sets of filter criteria that are generated by entities for association with some or all of the subscribers in the subscriber base, sets of filter criteria that are associated with particular subscribers, etc. These various sets of filter criteria may be processed (e.g., culled, concatenated, reconciled, etc.) to generate a retrieved set of filter criteria for filtering the network traffic for a subscriber.

For example, a subscriber checks his account balance online through his bank account's website. Certain global filter criteria preset by the ISP filter non-subscriber-specific, non-content-specific information from the traffic, like information used by the web browser to render the web page, etc. Another set of filter criteria set by the bank prevents collection by the network traffic processing system 330 of certain proprietary data, certain account information, etc. Still another set of filter criteria set by the subscriber allows collection by the network traffic processing system 330 of certain types of information relating to the browsing (e.g., the fact that the subscriber is using online banking, and that the use is occurring on a weekday evening).

Embodiments of the network traffic processing system 330 collect the data that is allowed by the filter module 350 in an inspection data store 354b. Data that is denied by the filter module 350 may be discarded or otherwise handled. It is worth noting that embodiments of the filter module 350 determine what data is or is not stored in the inspection data store 354b. Data is filtered only from collection or accessibility by and through the network traffic processing system 330, not over the remainder of the network(s) 328. As such, actions of the filter module 350 may have little or no impact on the subscriber's network usage experience.

In some embodiments, the network traffic processing system 330 includes an interface module 358 in communication with the one or more networks 328. Embodiments of the interface module 358 are adapted to receive requests (e.g., queries) for inspection data stored in the inspection data store 354b and/or to filter criteria stored in the filter criteria data store 354a. In some embodiments, the requests are processed by an access control module 362. The access control module 362 may be in communication with the interface module 358, and adapted to control access to the inspection data and/or the filter criteria. For example, parties requesting certain inspection data and/or filter criteria may log into a portal via a website. The access control module 362 may determine whether the requesting party is authorized to retrieve the requested information either prior to interpreting the request (e.g., the requesting party may be require to log in to determine even whether the party is authorized to make requests) and/or after receiving or interpreting the request (e.g., the authorization determination may be based on what kind of data is being requested).

Different types of entities may act as requesting parties for different reasons. In some embodiments, a subscriber is the requesting party; while, in other embodiments, the requesting party is another entity (e.g., an advertiser, a broker of subscriber information, a service provider, etc.). The requesting party accesses the network traffic processing system 330 over the network(s) 328 via the interface module 358. In certain embodiments, the interface module 358 includes a web server for providing a web interface (e.g., a web portal) through which login information, queries, etc. are received by the network traffic processing system 330.

The requesting party provides authentication information through the interface module 358 for use by the access control module 362 in authorizing access for the subscriber to the requested information. For example, the authentication information may include a network identifier associated with the requesting party (e.g., an IP address of the subscriber network access point 150 of FIG. 1, a user name, etc.), an authenticator (e.g., a password, an encryption key, a proprietary protocol, etc.), etc. The requesting party may request access to inspection data stored in the inspection data store 354b and/or to filter criteria stored in the filter criteria data store 354a.

The request from the requesting party may be further processed by an extraction layer module 366. Embodiments of the extraction layer module 366 are adapted to access (e.g., retrieve, modify, etc.) inspection data and/or filter criteria as a function of the request and authorization determinations made by the access control module 362. In one example, the requesting party, a subscriber, desires to opt into a type of data collection for use by advertisers, in exchange for a reduced rate on network services from the subscriber's ISP. The subscriber logs into the network traffic processing system 330 through the interface module 358 and is authenticated by the access control module 362. The request is processed by the extraction layer module 366, which modifies the relevant filter criteria stored in the filter criteria data store 354a in association with the subscriber.

In another example, the requesting party is an Internet watchdog organization. The Internet watchdog organization desires to verify that certain filter criteria are being used effectively to filter certain private information from being collected from individuals as they browse the web. The Internet watchdog organization logs into the network traffic processing system 330 through the interface module 358 and is authenticated by the access control module 362. The request is processed by the extraction layer module 366, which generates a report, including relevant filter criteria, information relating to operation of the filter criteria (e.g., how and when the filter is being applied, what data is being filtered or collected, statistics, etc.).

In yet another example, the requesting party is a usage profile module (e.g., the network usage profile module 160 of FIG. 1). The usage profile module intends to extract filtered inspection data for use in developing network usage profiles. For example, the inspection data may be used to help generate a devices-by-user profile (e.g., defining what types of network devices a subscriber is using to interface with the network(s) 328). The usage profile module interfaces with the network traffic processing system 330 through the interface module 358 and sends authentication data to the access control module 362, along with a query string. The query string is processed by the extraction layer module 366, which retrieves relevant inspection data from the inspection data store 354b.

In some embodiments, the filter criteria data store 354a and/or the inspection data store 354b is adapted to store data in various authentication layers, each accessible to requesting parties having specific types of authorization. For example, one authentication layer may be open to any requesting party having a valid login ID. A second authentication layer may be restricted only to requesting parties that have been granted specific authorization for the specific requested data. Any number or type of authentication layer is possible, according to embodiments of the invention.

In certain embodiments, the authentication layers may be established and/or managed by various entities through the extraction layer module 366. In one embodiment, a service provider that manages the network traffic processing system 330 controls the authentication layers and which entities are authorized for each authentication layer. In another embodiment, subscribers are given partial or complete control over management of authentication layers. A subscriber may grant access for different entities or types of entities to specific data, types of data, or other data characteristics (e.g., times of day, amounts of data, etc.).

In one embodiment, the subscriber categorizes specific URL requesters (e.g., as medical, financial, legal, etc.). Each category is then associated with an authentication layer (e.g., by the subscriber, the ISP, etc.). For example, a financial requester may have access to otherwise restricted financial information within the inspection data, while a medical requester does not; but the medical requester may have access to otherwise restricted personal health information within the inspection data, while the financial requester does not.

In some embodiments of the network traffic processing system 330, some or all of its components are in communication with (or include) one or more data stores. In certain embodiments, the components are in communication with the data store(s) over the network(s) 330 (e.g., using cloud computing, networked servers, etc.). In other embodiments, the components are in communication with the data store(s) via the bus 326 (e.g., the data store(s) are included in or in communication with the storage device(s) 308, the computer readable storage media reader 310a, the computer readable storage media 310b, the output device(s) 306, etc.).

It will be appreciated that the functionality of the network traffic processing system 330, and/or other components of the systems described in FIGS. 1-3 may be implemented in many other ways, according to embodiments of the invention. Further, many variations of the functionality are possible without regard for the specific system implementation of the functionality without departing from the scope of the invention. For example, some exemplary functionality of the various modules described herein, including the network traffic processing system 330, will now be described with reference to the methods of FIGS. 4 and 5.

Figure 4:
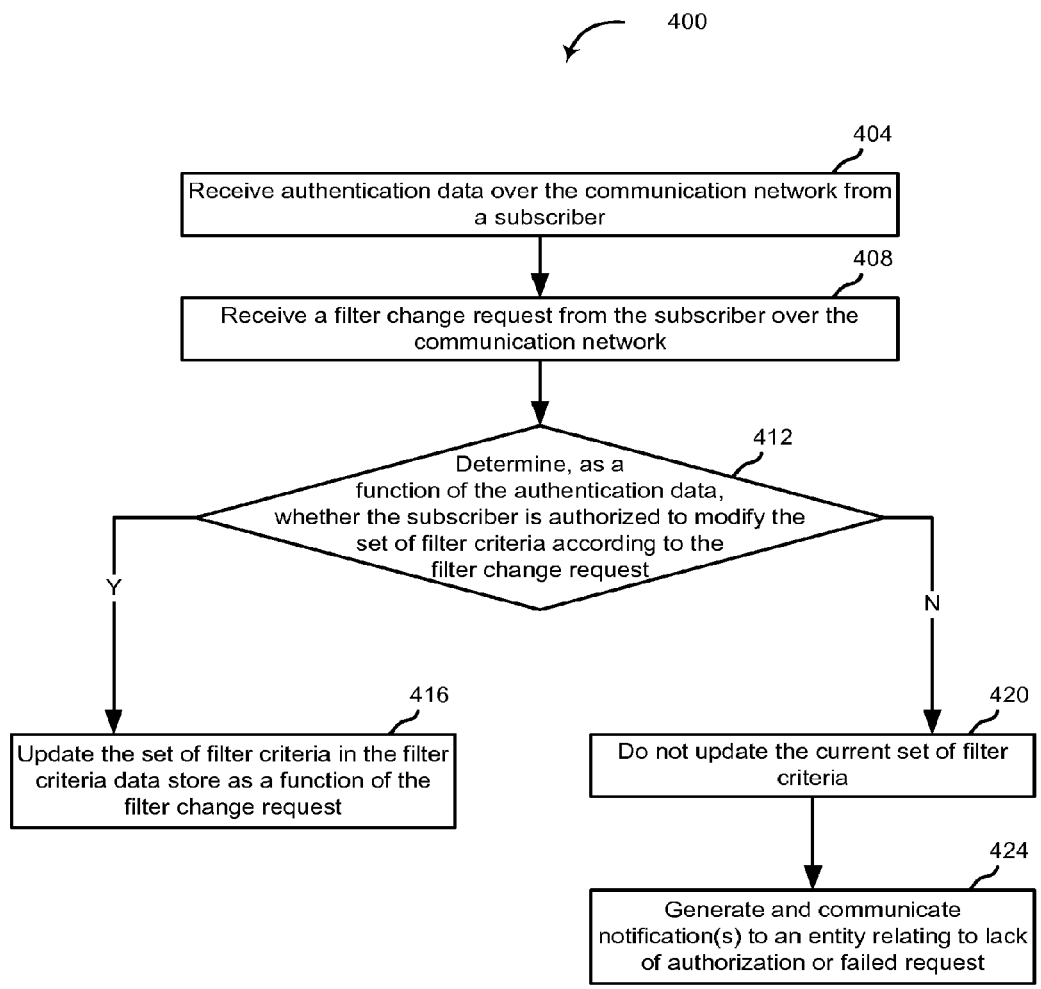
FIG. 4 shows a simplified flow diagram of an illustrative method for providing restricted access to filter criteria for increased transparency into network traffic inspection, according to various embodiments of the invention.

FIG. 4 shows a simplified flow diagram of an illustrative method for providing restricted access to filter criteria for increased transparency into network traffic inspection, according to various embodiments of the invention. Embodiments of the method 400 inspect network traffic traversing a portion of a communication network (e.g., like the access network 120 of FIG. 1) using a network traffic inspection system having a traffic inspection module (e.g., like the network traffic processing system 330 and the traffic inspection module 346 of FIG. 3). The method 400 begins at block 404 by receiving authentication data over the communication network from a subscriber. For example, the subscriber may be a subscriber of network services from an ISP, a subscriber of filter transparency services, etc.

At block 408, the method 400 receives a filter change request from the subscriber over the communication network. The filter change request may define a modification to a set of filter criteria for filtering network traffic. In some embodiments, the set of filter criteria is stored in association with the subscriber in a filter criteria data store (e.g., like the filter criteria data store 354a of FIG. 3). The method 400 determines at block 412, as a function of the authentication data, whether the subscriber is authorized to modify the set of filter criteria according to the filter change request.

When the subscriber is authorized to modify the set of filter criteria according to the filter change request, the set of filter criteria in the filter criteria data store is updated as a function of the filter change request at block 416. For example, the current filter criteria may be retrieved from the filter criteria data store and modified (e.g., altered, overwritten, etc.) according to the filter change request. When the subscriber is not authorized to modify the set of filter criteria according to the filter change request, the method 400 does not modify the current set of filter criteria at block 420. In certain embodiments, other steps may be performed in the event that the subscriber lacks authorization. For example, at block 424, one or more notifications may be generated and communicated to an entity (e.g., to the service provider to indicate an unauthorized access attempt, to a logging module to log the unsuccessful attempt, to the subscriber, etc.).

Figure 5:
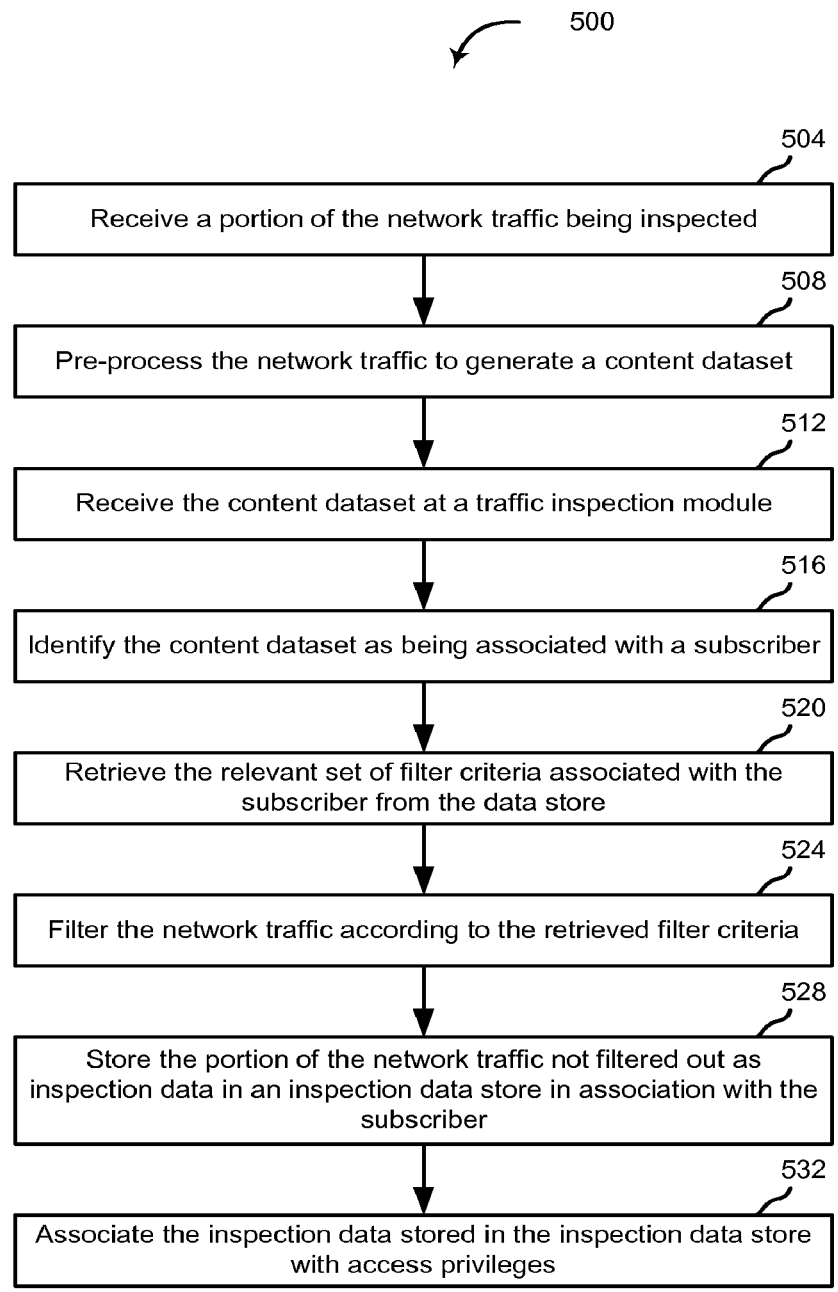
FIG. 5 shows a simplified flow diagram of an illustrative method for filtering network traffic as a function of transparent filter criteria, according to various embodiments of the invention.

FIG. 5 shows a simplified flow diagram of an illustrative method for filtering network traffic as a function of transparent filter criteria, according to various embodiments of the invention. As with the method 400 of FIG. 4, embodiments of the method 500 inspect network traffic traversing a portion of a communication network (e.g., like the access network 120 of FIG. 1) using a network traffic inspection system having a traffic inspection module (e.g., like the network traffic processing system 330 and the traffic inspection module 346 of FIG. 3). The method 500 begins at block 504 by receiving a portion of the network traffic being inspected.

At block 508, the network traffic is pre-processed. For example, the traffic may be pre-filtered, buffered, or otherwise pre-processed to generate a content dataset. The content dataset is received at a traffic inspection module at block 512. The content dataset relates to the network traffic. In certain embodiments, the content dataset includes a portion of the network traffic (e.g., a subset of the data packets traversing the network, header information, etc.). In other embodiments, the content dataset includes metadata defining a characteristic of at least a portion of the network traffic (e.g., the content dataset represents data from a voice-over-IP phone call, a video stream, encrypted financial information, etc.).

The method identifies the content dataset as being associated with a subscriber at block 516. In certain embodiments, identifying the content dataset as being associated with the subscriber comprises determining whether the content dataset originated from or is destined for a network node associated with the subscriber. For example, the source or destination IP address may be parsed from the header information of certain data packets within the content dataset.

The relevant set of filter criteria associated with the subscriber from the data store is then retrieved at block 520. At block 524, the network traffic is filtered as a function of the retrieved set of filter criteria. For example, a portion of the network traffic is kept for collection and/or further analysis, while the rest is discarded or otherwise handled. At block 528, the portion of the network traffic not filtered out in block 520 is stored as inspection data in an inspection data store in association with the subscriber. In some embodiments, at block 532, the inspection data stored in the inspection data store is associated with certain access privileges (e.g., authentication layers, levels of encryption, etc.).

Figure 6:
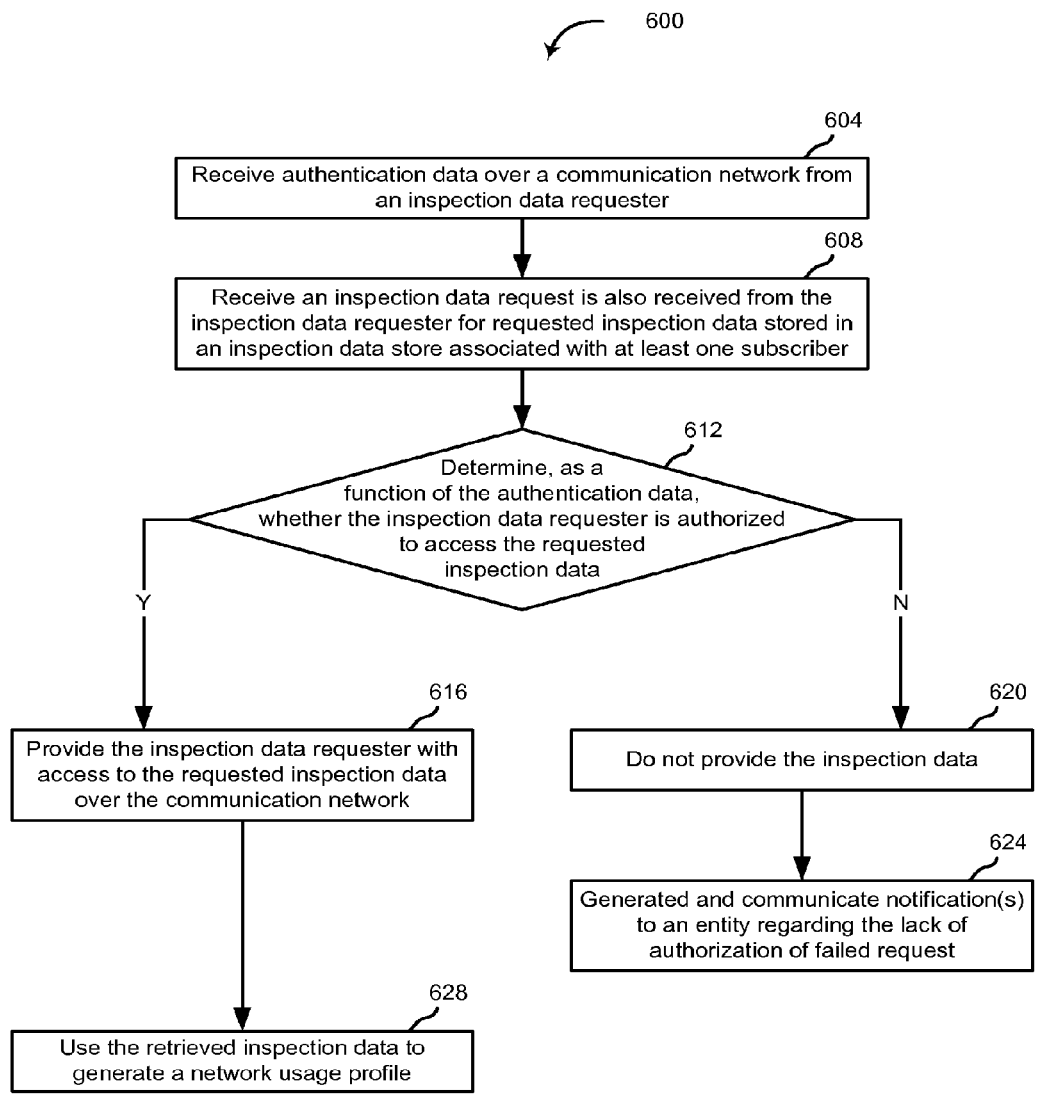
FIG. 6 shows a simplified flow diagram of an illustrative method for providing restricted access to inspection data filtered from network traffic, according to various embodiments of the invention.

FIG. 6 shows a simplified flow diagram of an illustrative method for providing restricted access to inspection data filtered from network traffic, according to various embodiments of the invention. Embodiments of the method 600 provide access to the inspection data through one or more networks (e.g., like the network(s) 328 of FIG. 3), where the inspection data is generated, stored, and/or handled by a network traffic inspection system having a traffic inspection module (e.g., like the network traffic processing system 330 and the traffic inspection module 346 of FIG. 3).

The method 600 begins at block 604 by receiving authentication data over a communication network from an inspection data requester. At block 608, an inspection data request is also received from the inspection data requester for requested inspection data stored in an inspection data store associated with at least one subscriber. The method 600 then determines at block 612, as a function of the authentication data, whether the inspection data requester is authorized to access the requested inspection data. In some embodiments, the inspection data store is configured to store the inspection data in association with one of multiple authentication levels, each authentication level defining a set of privileges required for access to the associated inspection data. As such, the determination at block 612 may include determining the authentication level associated with the requested inspection data.

At block 616, when the inspection data requester is authorized to access the requested inspection data, the method 600 provides the inspection data requester with access to the requested inspection data over the communication network. At block 620, when the inspection data requester is not authorized to access the requested inspection data, the method 600 does not provide the inspection data. In certain embodiments, other steps may be performed in the event that the inspection data requester lacks authorization. For example, at block 624, one or more notifications may be generated and communicated to an entity (e.g., to the service provider to indicate an unauthorized access attempt, to a logging module to log the unsuccessful attempt, to the inspection data requester, etc.).

In some embodiments, at block 628, the inspection data requester uses the inspection data retrieved in block 616 in the generation of a network usage profile. For example, the method 600 may generate a devices-by-user profile defining a set of devices being used by the subscriber to communicate with the communication network and associate a portion of the content dataset with at least one of the set of devices as a function of the devices-by-user profile. The devices-by-user profile may then be used to provide additional functionality, for example, when some of the filter criteria relate to characteristics of some of the devices being used by the subscriber. For example, advertisers may generate devices-by-user profiles for subscribers according to their associated inspection data (e.g., accessed using steps of the method 600), and target advertisements to the subscribers' devices accordingly.

It will be apparent to those skilled in the art that substantial variations may be made in accordance with specific requirements to all of the systems, methods, software, and other embodiments described above. For example, customized hardware might also be used, and/or particular elements might be implemented in hardware, software (including portable software, such as applets, etc.), or both. Further, connection to other computing devices such as network input/output devices may be employed.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for inspecting network traffic traversing a portion of a communication network using a network traffic inspection system having a traffic inspection module, the method comprising:
receiving a filter change request from a subscriber over the communication network, the filter change request defining a modification to a set of filter criteria for filtering network traffic, the set of filter criteria being stored in association with the subscriber in a filter criteria data store;
updating the set of filter criteria in the filter criteria data store as a function of the filter change request;
receiving a content dataset at the traffic inspection module, the content dataset relating to the network traffic;
identifying the content dataset as being associated with the subscriber;
retrieving the set of filter criteria associated with the subscriber from the data store; and
filtering the network traffic as a function of the set of filter criteria, so that a portion of the network traffic is stored as inspection data in an inspection data store in association with the subscriber and another portion of the network traffic is discarded.

2. The method of claim 1, further comprising:
receiving authentication data over the communication network from the subscriber; and
determining as a function of the authentication data whether the subscriber is authorized to modify the set of filter criteria according to the filter change request,
wherein the updating step is performed only when the subscriber is authorized to modify the set of filter criteria according to the filter change request.

3. The method of claim 1, wherein the subscriber is a subscriber of network services over the communication network, and the filter change request comprises a request to block storage of a type of subscriber information in the inspection data store.

4. The method of claim 1, wherein the subscriber is a provider of content over the communication network.

5. The method of claim 1, wherein the subscriber is an agent of a filter generation authority having authorization to generate or modify a set of filter criteria on behalf of a group of users of network services over the communication network.

6. The method of claim 5, wherein the filter generation authority is part of a government regulatory authority.

7. The method of claim 1, wherein the filter criteria data store comprises a plurality of sets of filter criteria, each associated with at least one of a plurality of subscribers.

8. The method of claim 1, wherein only a portion of the set of filter criteria is modifiable by the filter change request.

9. The method of claim 1, wherein the set of filter criteria comprises a set of default filter criteria.

10. The method of claim 1, further comprising:
prior to receiving the portion of the network traffic at the traffic inspection module, pre-filtering the network traffic to generate the content dataset.

11. The method of claim 1, wherein the content dataset comprises a portion of the network traffic.

12. The method of claim 1, wherein the content dataset comprises metadata defining a characteristic of at least a portion of the network traffic.

13. The method of claim 1, further wherein identifying the content dataset as being associated with the subscriber comprises determining whether the content dataset originated from or is destined for a network node associated with the subscriber.

14. The method of claim 1, wherein the inspection data store is accessible via the communication network.

15. The method of claim 14, further comprising:
receiving authentication data over the communication network from an inspection data requester;
receiving an inspection data request from the inspection data requester for requested inspection data stored in the inspection data store associated with at least one subscriber;
determining as a function of the authentication data whether the inspection data requester is authorized to access the requested inspection data; and
when the inspection data requester is authorized to access the requested inspection data, providing the inspection data requester with access to the requested inspection data over the communication network.

16. The method of claim 14, wherein the inspection data store is configured to store the inspection data in association with one of a plurality of authentication levels, each authentication level defining a set privileges required for access to the associated inspection data.

17. The method of claim 16, further comprising:
receiving authentication data over the communication network from a inspection data requester;
receiving an inspection data request from the inspection data requester for requested inspection data stored in the inspection data store;
determining the authentication level associated with the requested inspection data;
determining as a function of the authentication data and the determined authentication level whether the inspection data requester is authorized to access the requested inspection data; and
when the inspection data requester is authorized to access the requested inspection data, providing the inspection data requester with access to the requested inspection data over the communication network.

18. The method of claim 1, wherein the traffic inspection module inspects the network traffic using deep packet inspection.

19. The method of claim 1, further comprising:
generating a devices-by-node profile defining a set of devices being used by the subscriber to communicate with the communication network; and
associating a portion of the content dataset with at least one of the set of devices as a function of the devices-by-node profile,
wherein at least one of the set of filter criteria relates to a characteristic of the at least one of the set of devices.

20. A system for inspecting network traffic traversing a portion of a communication network, the system comprising:
a filter criteria data store adapted to store sets of filter criteria for filtering network traffic, each set of filter criteria being stored in association with one of a plurality of subscribing entities;
an interface module in operative communication with the filter criteria data store and adapted to:
receive a filter change request from a subscriber over the communication network, the filter change request defining a modification to the set of filter criteria associated with the subscriber, the subscriber being one of the plurality of entities; and
modify the set of filter criteria associated with the subscriber as a function of the filter change request;
a data receiver module, adapted to receive network traffic traversing a portion of the communication network;
a traffic inspection module, in operative communication with the data receiver module and adapted to receive a content dataset relating to at least a portion of the network traffic and to identify that the content dataset is associated with the subscriber; and
a filter module, in operative communication with the traffic inspection module and the filter criteria data store, and adapted to filter at least a portion of the network traffic as a function of the set of filter criteria associated with the subscriber, so that a portion of the network traffic is stored as inspection data in an inspection data store in association with the subscriber and another portion of the network traffic is discarded.

21. The system of claim 20, further comprising:
an access control module in operative communication with the interface module and the filter module and adapted to:
receive the filter change request;
receive authentication data over the communication network from the subscriber;
determine as a function of the authentication data whether the subscriber is authorized to modify the set of filter criteria according to the filter change request; and
direct the filter criteria data store to modify the set of filter criteria associated with the subscriber as a function of the filter change request when the subscriber is authorized.

22. The system of claim 21, further comprising:
an extraction layer module in operative communication with the access control module and the inspection data store and adapted to:
receive a query from the access control module, wherein the query is generated by the access control module as a function of query data received over the communication network from an inspection data requester;
receive authorization to execute the inspection data query from the access control module, wherein the authorization is determined by the access control module as a function of authorization data received over the communication network from the inspection data requester;
execute the inspection query against inspection data stored in the inspection data store to generate inspection query results; and
provide the inspection data requester with access to the query results over the communication network.

23. The system of claim 21, further comprising:
an extraction layer module in operative communication with the access control module and the inspection data store and adapted to:
  receive a query from the access control module, wherein the query is generated by the access control module as a function of query data received over the communication network from an inspection data requester;
  receive authorization to execute the inspection data query from the access control module, wherein the authorization is determined by the access control module as a function of authorization data received over the communication network from the inspection data requester, and the authorization indicates an authentication level associated with the inspection data requester;
  execute the inspection query against inspection data stored in the inspection data store to generate inspection query results,
    wherein the inspection data store is configured to store the inspection data in association with one of a plurality of authentication levels, each authentication level defining a set privileges required for access to the associated inspection data, and the inspection query is executed as a function of the authentication level associated with the inspection data requester and the authentication level associated with the associated inspection data; and
  provide the inspection data requester with access to the query results over the communication network.

24. The system of claim 20, further comprising:
a pre-filter module in operative communication with the data receiver module and adapted to pre-filter the network traffic to generate the content dataset.

25. The system of claim 20, further wherein identifying the content dataset as being associated with the subscriber comprises determining whether the content dataset originated from or is destined for a network node associated with the subscriber.

26. A computational system comprising a computer-readable storage medium having a computer-readable program embodied therein for inspecting network traffic traversing at least a portion of a communication network, the computer-readable program including instructions in accordance with the following:
  receiving a filter change request from a subscriber over the communication network, the filter change request defining a modification to a set of filter criteria for filtering network traffic, the set of filter criteria being stored in association with the subscriber in a filter criteria data store;
  updating the set of filter criteria in the filter criteria data store as a function of the filter change request;
  receiving a content dataset at the traffic inspection module, the content dataset relating to the network traffic;
  identifying the content dataset as being associated with the subscriber;
  retrieving the set of filter criteria associated with the subscriber from the data store; and
  filtering the network traffic as a function of the set of filter criteria, so that a portion of the network traffic is stored as inspection data in an inspection data store in association with the subscriber and another portion of the network traffic is discarded.

27. The computational system of claim 26, wherein the computer-readable program includes instructions further in accordance with:
  receiving authentication data over the communication network from an inspection data requester;
  receiving an inspection data request from the inspection data requester for requested inspection data stored in the inspection data store associated with at least one subscriber;
  determining as a function of the authentication data whether the inspection data requester is authorized to access the requested inspection data; and
  when the inspection data requester is authorized to access the requested inspection data, providing the inspection data requester with access to the requested inspection data over the communication network.

* * * * *